Jan. 26, 1965     W. R. UTTAL     3,166,856
EDUCATIONAL DEVICE
Filed Feb. 9, 1962     10 Sheets-Sheet 1
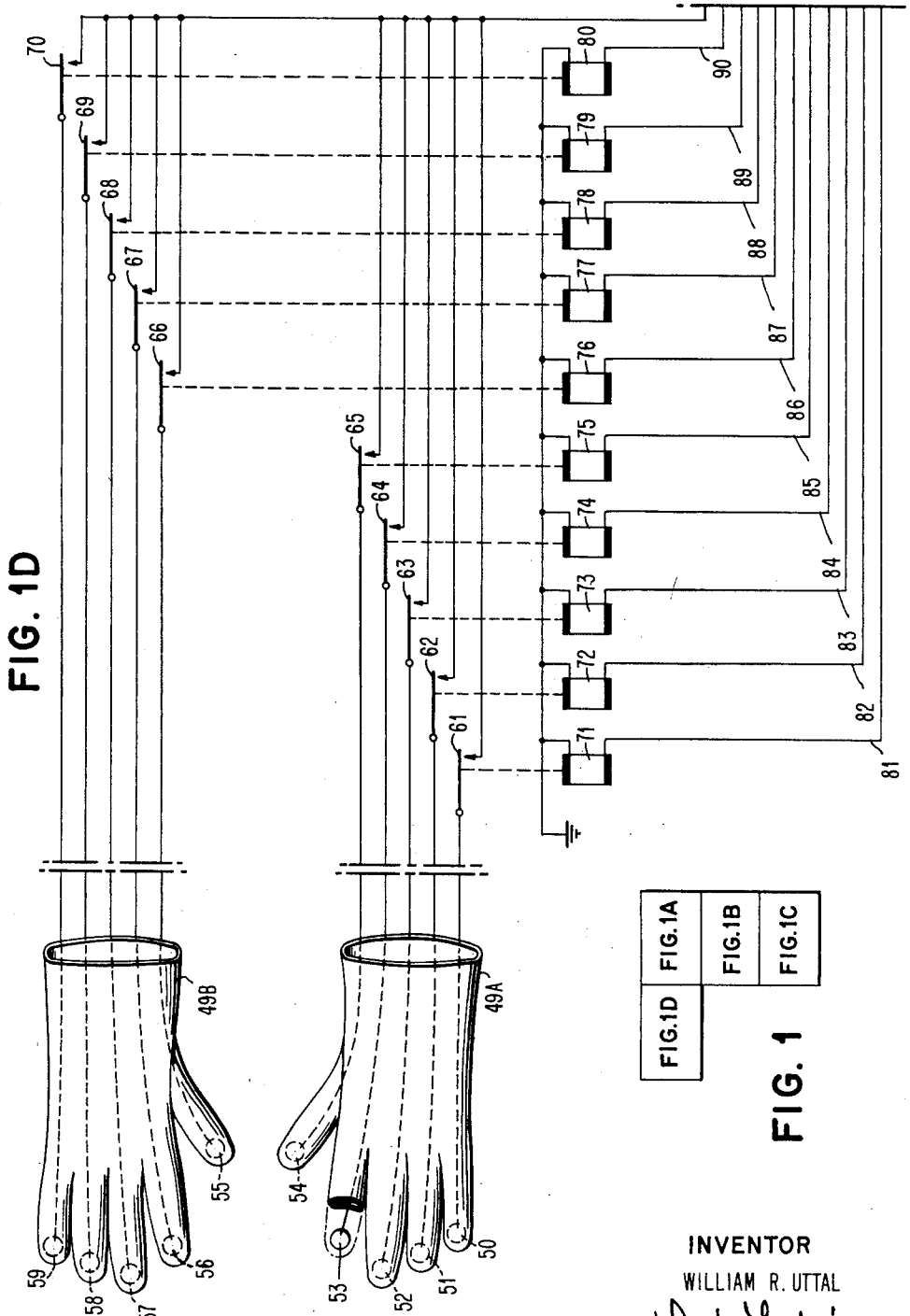
INVENTOR
WILLIAM R. UTTAL
BY John J. Goodwin
ATTORNEY Jan. 26, 1965    W. R. UTTAL    3,166,856
EDUCATIONAL DEVICE
Filed Feb. 9, 1962    10 Sheets-Sheet 2

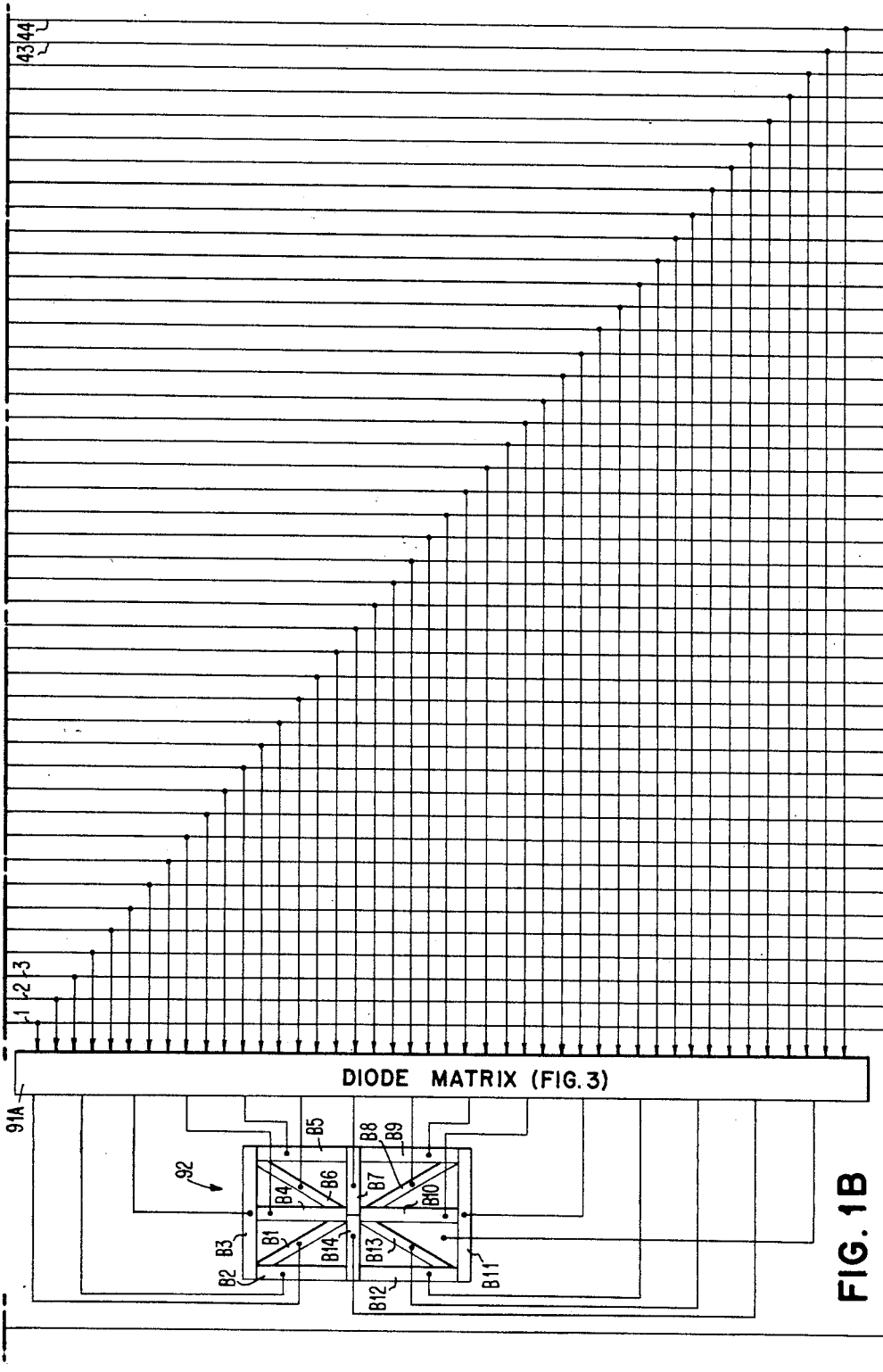

Jan. 26, 1965  W. R. UTTAL  3,166,856
EDUCATIONAL DEVICE
Filed Feb. 9, 1962  10 Sheets-Sheet 7

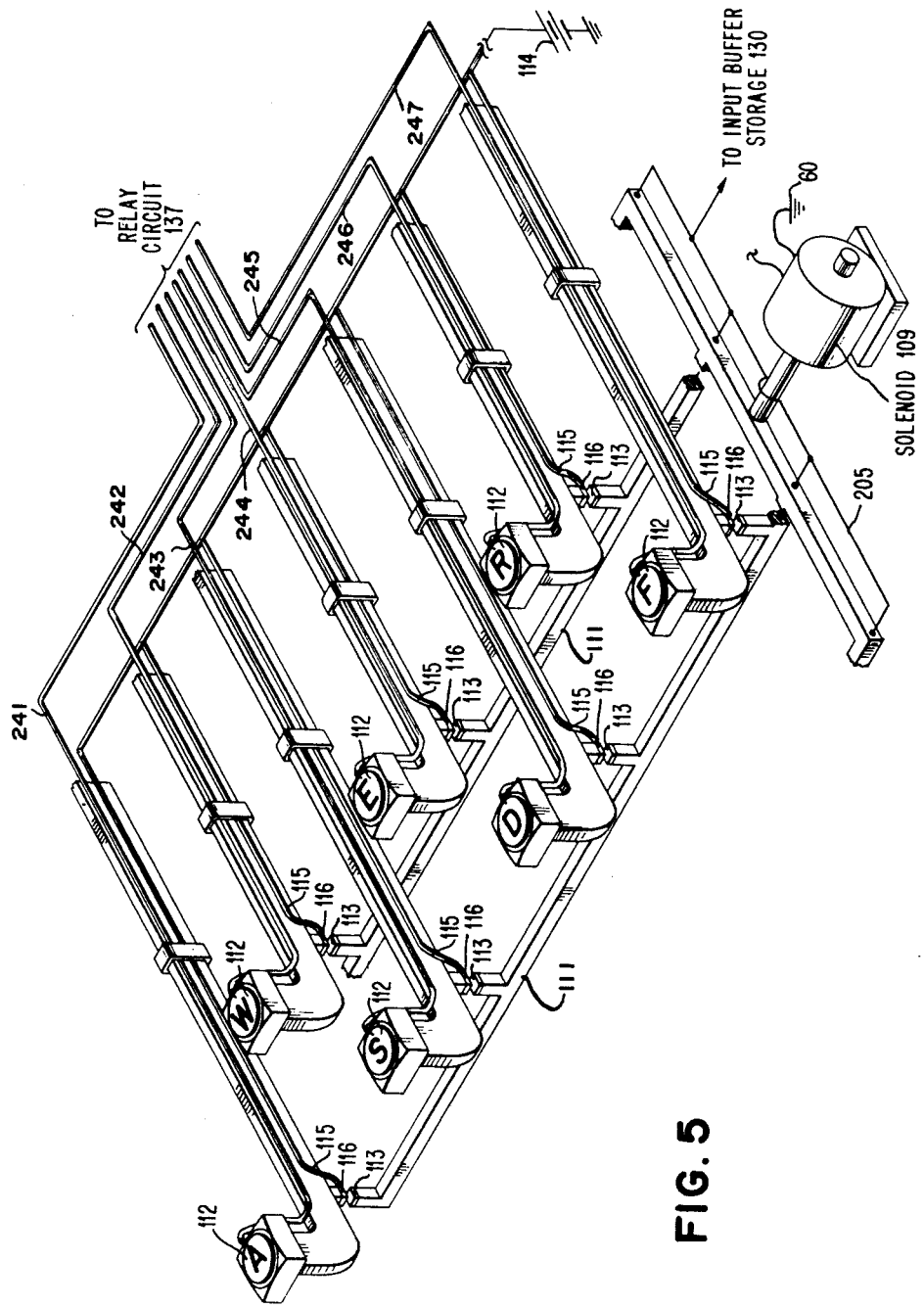

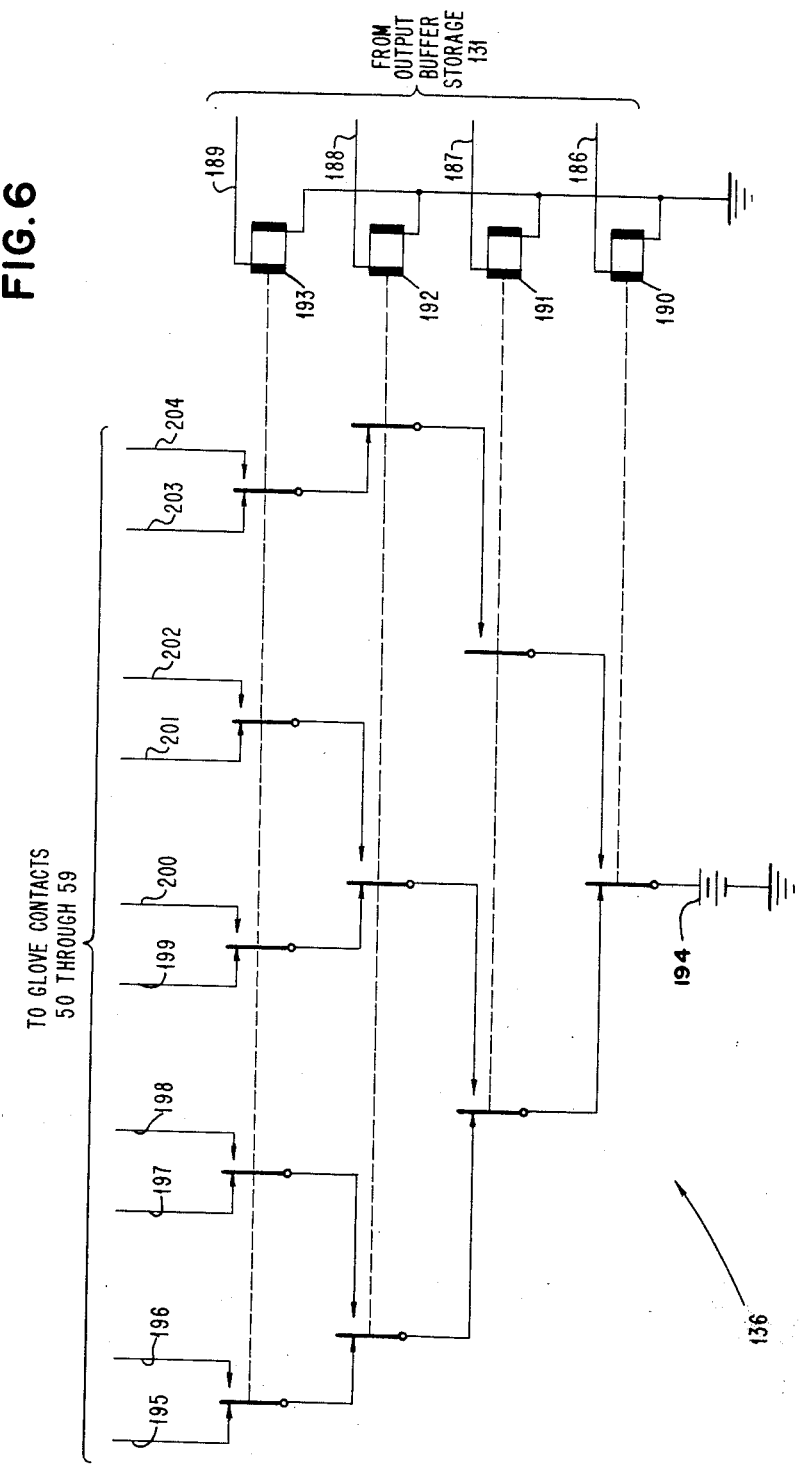

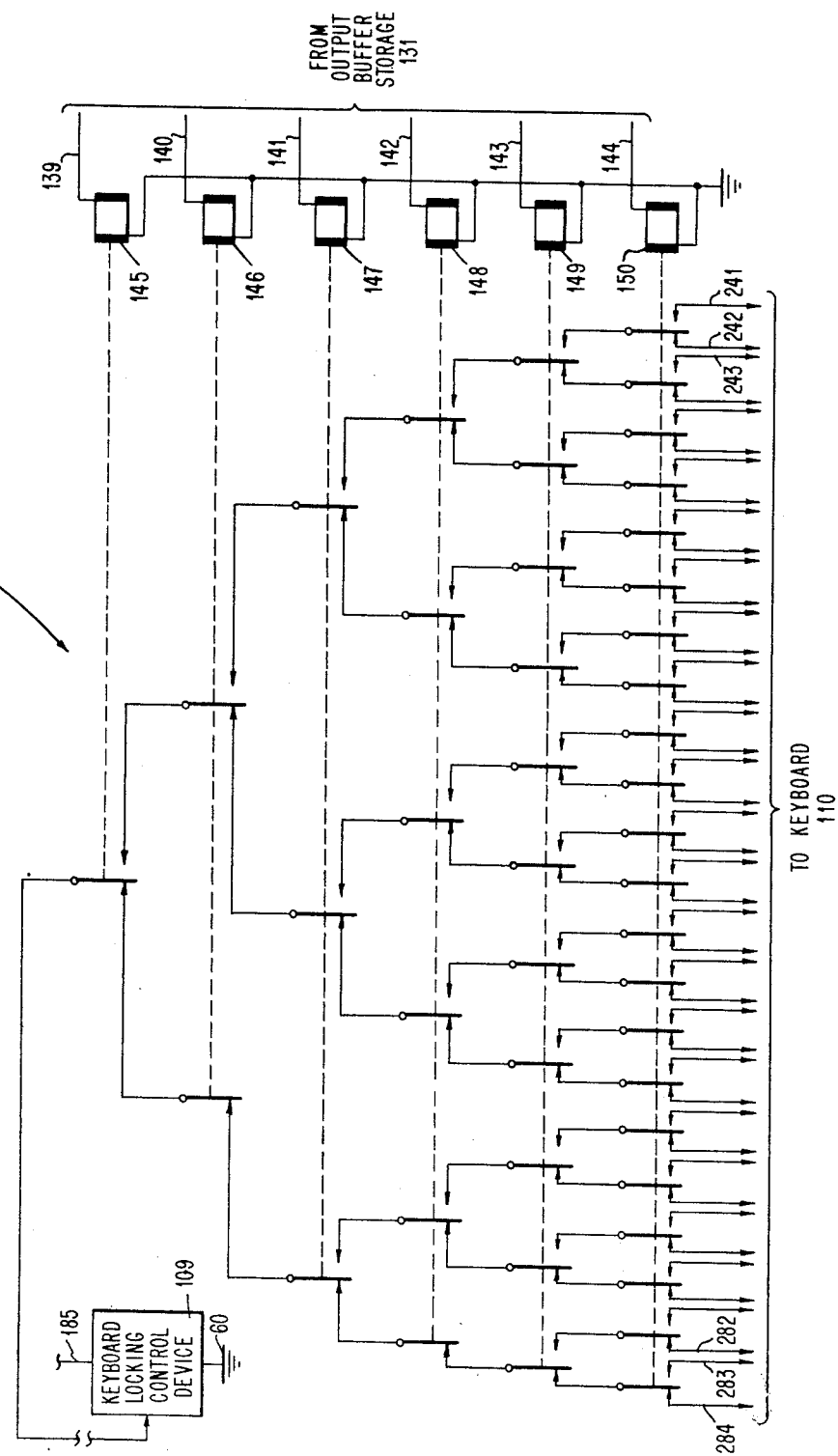

United States Patent Office 3,166,856
Patented Jan. 26, 1965

3,166,856
EDUCATIONAL DEVICE
William R. Uttal, Yorktown Heights, N.Y., assignor to International Business Machines Corporation, New York, N.Y., a corporation of New York
Filed Feb. 9, 1962, Ser. No. 172,275
13 Claims. (Cl. 35—6)

The present invention relates to automated educational devices and more particularly to an apparatus for teaching manual dexterity. There are many skills which require a high degree of manual dexterity particularly in manipulating the fingers. For example, skills such as typewriting, teletypewriting, and the operation of certain musical instruments such as the piano and trumpet. Various schemes and devices have been developed for teaching or improving the ability of a person in performing these finger manipulating skills. Such devices range from simple printed charts and diagrams for indicating the points of contact usually encountered by the finger tips in the execution of the skill to more elaborate systems which include the actual device upon which the fingers operate in performing the particular skills. Devices of the type described often include a second function in addition to their function of teaching the particular finger manipulating skill. This second function is that of testing the student's progress in acquiring the skill. The two functions of testing and teaching by means of such devices are usually related in that the teaching feature is in reality a self-testing technique whereby the student is enabled through repeated practice on the device to recognize and avoid errors. One factor in determining the value of such teaching and testing devices is the extent to which they accurately determine the ability of the person being tested to use the actual manual device. Another consideration in determining the adequacy of such device is how quickly the person being taught and/or tested may be apprised of his accuracy or progress. When a long period of time elapses between the time the student operates the device and the time the results of the operation are given to the student, the teaching ability of the device becomes less efficient.

A feature of the present invention is the provision of an educational device or teaching machine which may be used for teaching those skills which require the manipulation of the fingers and which in addition performs a testing function to determine the ability of a student in performing these skills.

Accordingly, an object of the present invention is to provide an improved educational device for teaching and developing skills which require a high degree of dexterity in using the fingers.

Another object of the present invention is to provide an improved educational device for teaching a manual skill which includes the actual device with which the student desires to become proficient.

A further object of the present invention is to provide an improved educational device having an immediate error indication facility.

A further object of the present invention is to provide an improved educational device having a large range of dynamic interaction between the apparatus and the student.

Another object of the present invention is to provide an improved educational device for simultaneously teaching a manual skill and testing the student's ability and progress in acquiring the skill.

A still further object of the present invention is to provide an improved educational device for teaching the skill of touch typewriting.

The foregoing and other objects, features and advantages of the invention will be apparent from the following more particular description of preferred embodiments of the invention, as illustrated in the accompanying drawings.

In the drawings:

FIGS. 1A, 1B, 1C, and 1D form a combined block diagram and schematic drawing of one embodiment of an educational device for the teaching and testing of the skill of touch typewriting following the principles of the present invention.

FIG. 5 is a detailed view of a portion of the modified typewriter keyboard shown in FIG. 4.

FIGS. 6 and 7 are schematic diagrams showing the relay logic circuits employed in the embodiment of FIG. 4.

While the principles of the present invention are applicable to a wide range of skills which involve manual dexterity in the manipulation of keyboards and the like, for purposes of illustration the invention will be described in relation to the skill of touch typewriting.

Figure 1A:
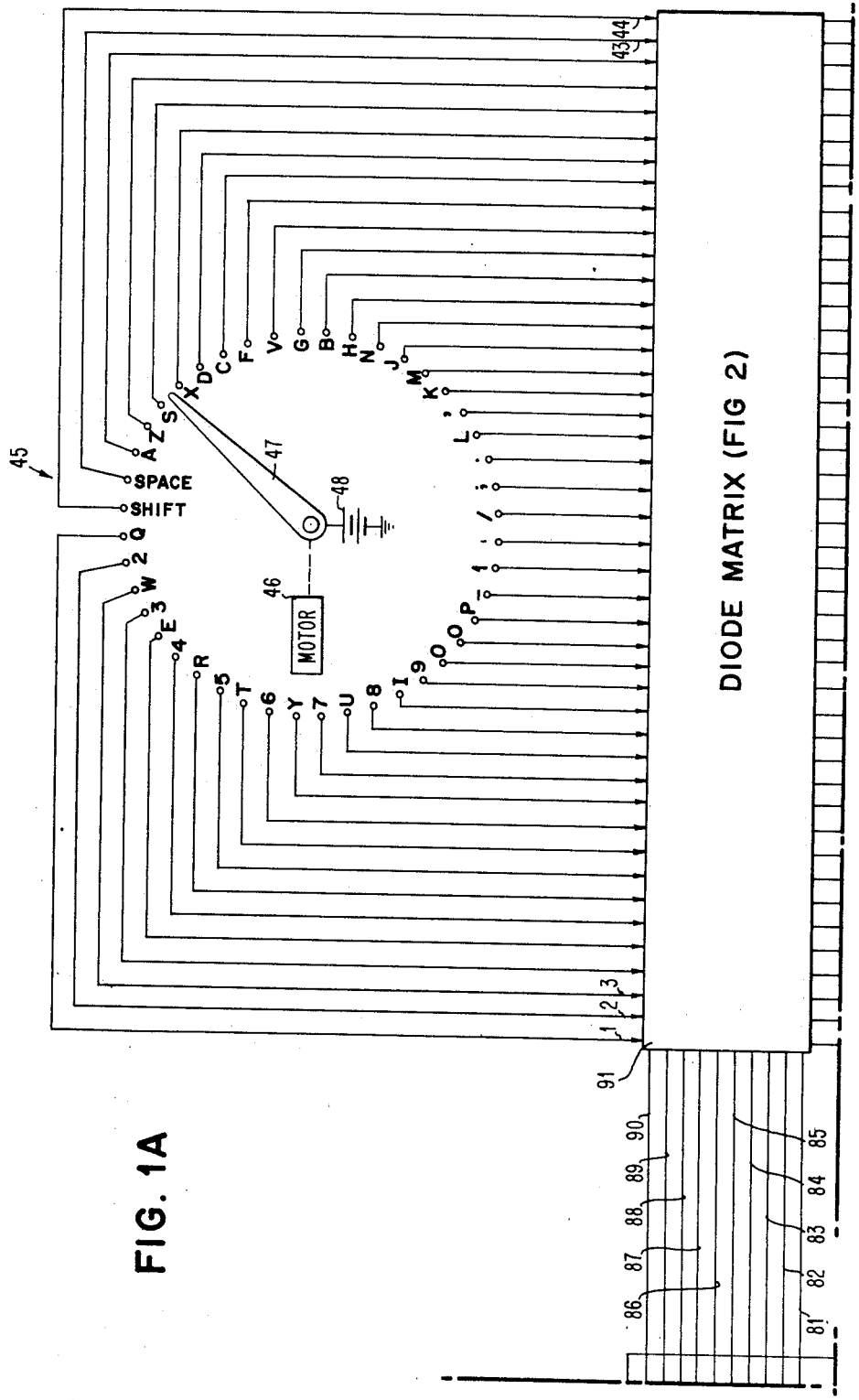
Figure 4:
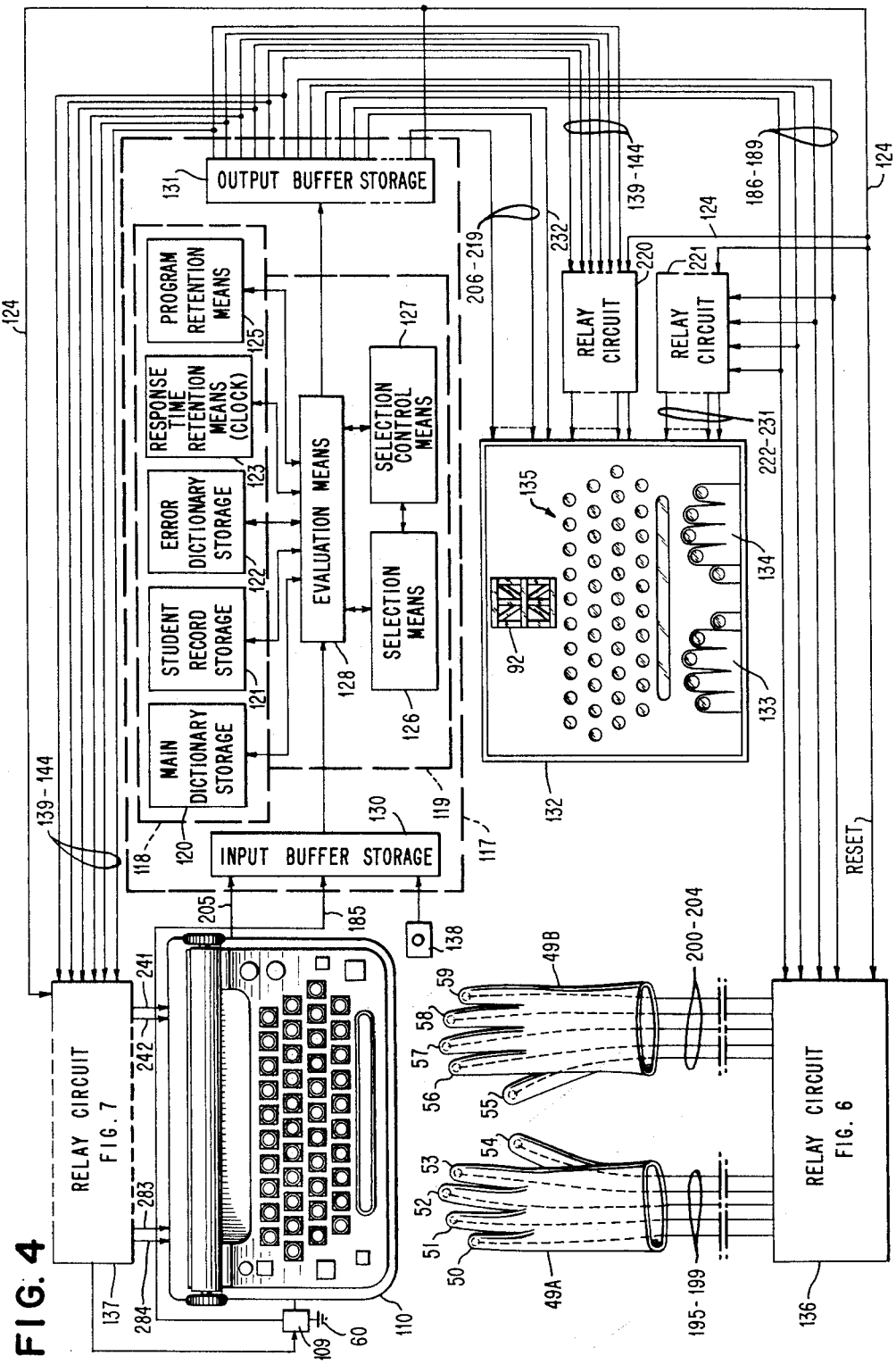
FIG. 4 is a functional block diagram of another embodiment of an educational apparatus for the teaching and testing of touch typewriting following the principles of the present invention.

In the skill known as touch typewriting, the typist operates the typewriter without looking at the keyboard. In order to be an accomplished touch typist, the person must not only depress the correct keys but must depress the keys with certain assigned fingers. The typewriter keys designated A, S, D, F, J, K, and L are known as "home row" keys and the typist manipulates the keyboard from this "home row." The "home row" and remaining keys on the keyboard are operated by selected fingers of both hands of the typist. For example, the keys A, Q, Z, and the shift key are struck with the little finger of the left hand while the keys Y, H, U, J, and N are struck with the index finger of the right hand. Each of the keys of the standard typewriter keyboard should be struck with a particular designated finger if the typist is to type rapidly and efficiently. In the embodiment of the present invention as shown in FIGS. 1 and 4 and described hereinbelow, an improved touch typewriting teaching and testing device is shown wherein it is insured that the person manipulating the modified typewriter keyboard will select the proper keys with the proper fingers designated for such keys.

Figure 1C:
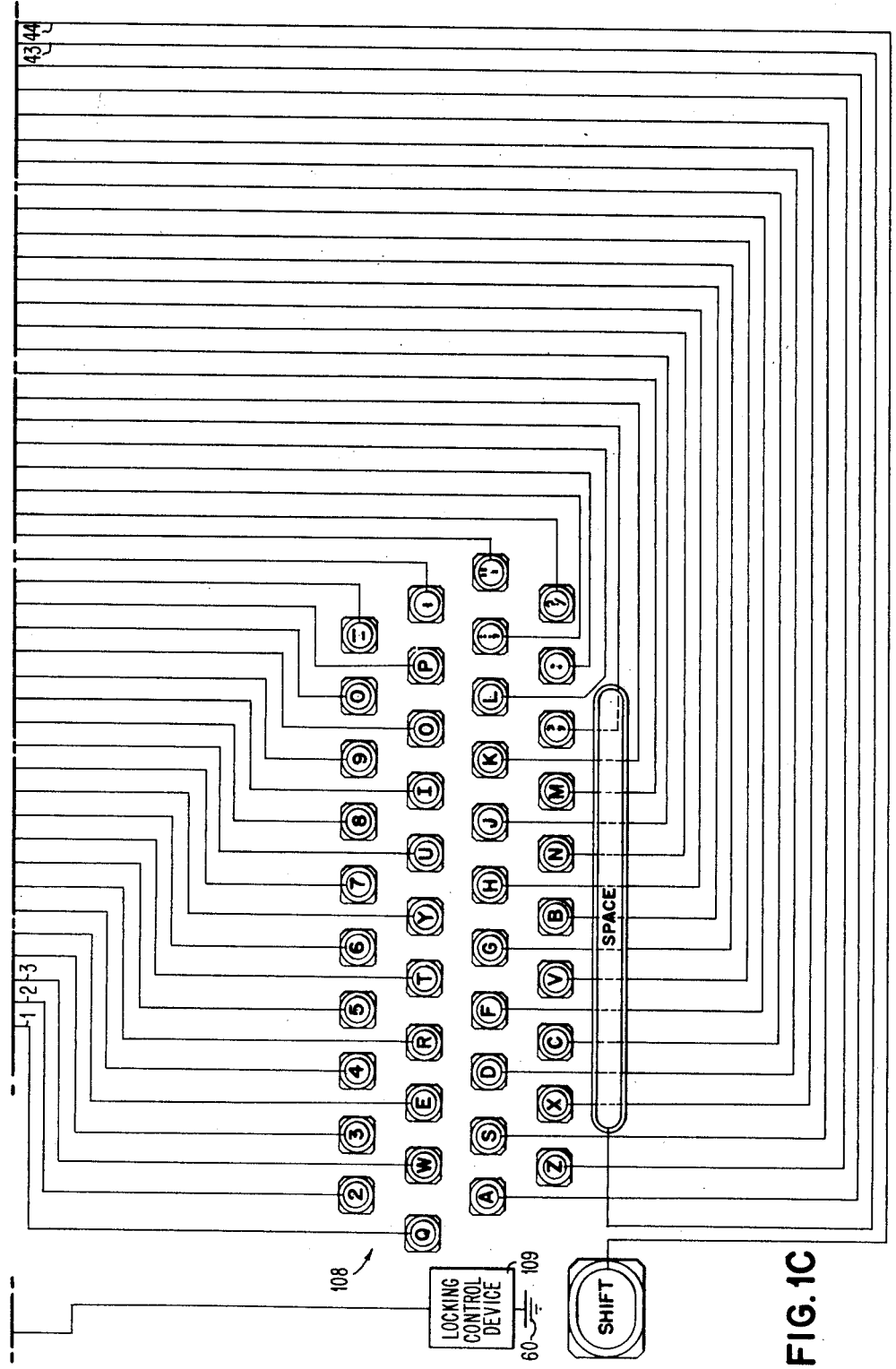
Figure 2:
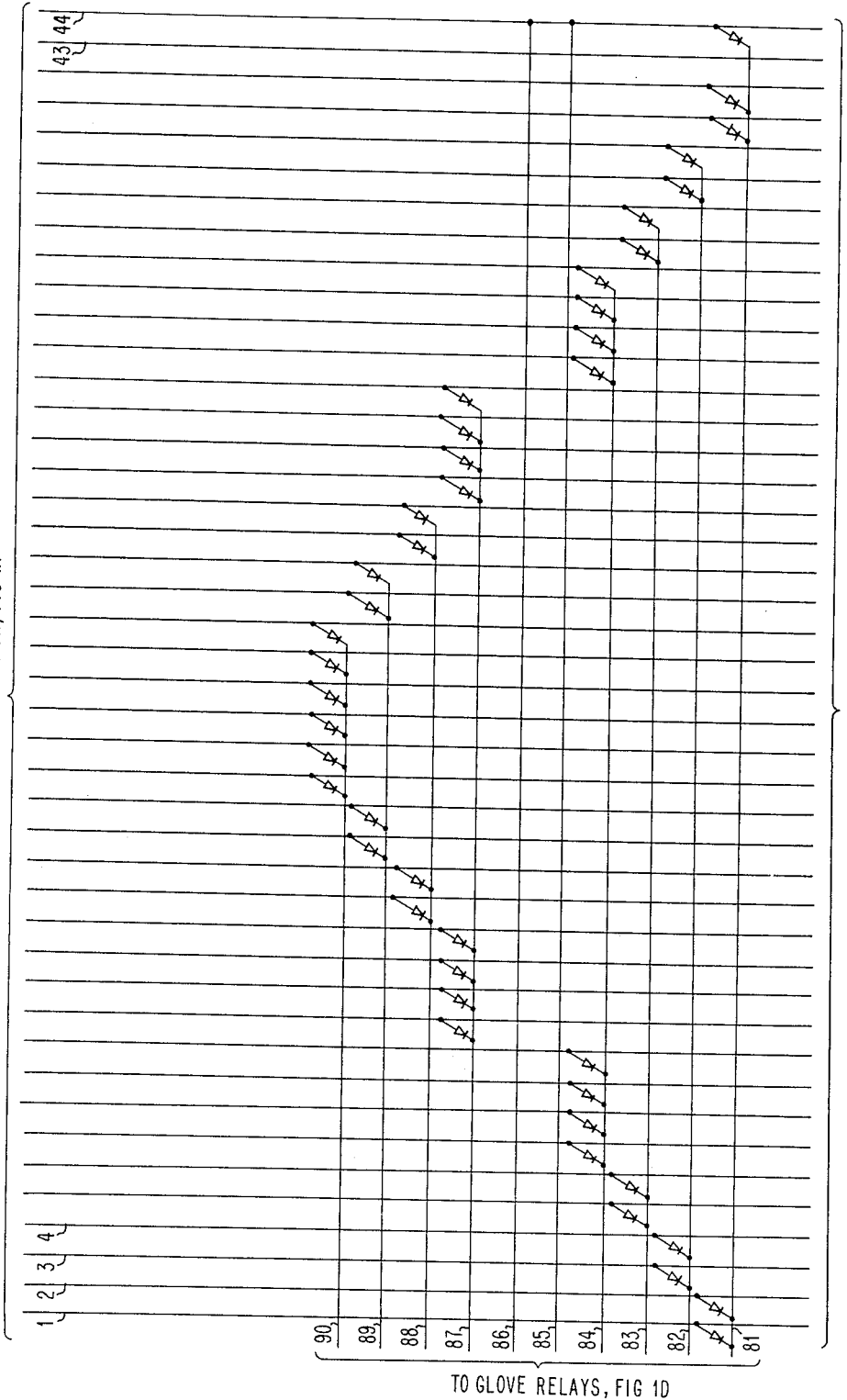
FIGS. 2 and 3 are detailed schematic diagrams of diode matrices employed in the educational device of FIGS. 1A, 1B, 1C, and 1D.

Referring to FIG. 1C, an apparatus for teaching touch typewriting is shown including a modified typewriter keyboard 108 having exposed electrical contacts located on the upper surface of the keys. Although the characters and symbols are shown as appearing on the keys for the purpose of explanation, during actual operation the keys are masked so the student will not be encouraged to look at the keyboard. A keyboard locking control device 109 is connected to a typewriter keyboard locking mechanism which normally maintains the keyboard in a "locked" condition such that it is not possible to physically depress the keys an amount sufficient for them to strike. The keyboard will remain in a "locked" condition until an electrical signal is transmitted to the locking control device (which may be a solenoid) which unlocks the keyboard locking mechanism. The keyboard locking mechanism is not shown in FIG. 1C, but an example of such device will be described with reference to FIG. 5. The contacts on the keys are connected via leads 1 through 44 to a sequential character generating device 45 (FIG. 1A) shown, for example, as a rotary stepping switch including motor 46 and rotor 47 which sequentially generates electrical signals which are transmitted to each of the forty-four keys of the typewriter keyboard. Motor 46 advances rotor 47 past the contacts of rotary switch 45 at a rate which may be adjusted to be compatible with the student's proficiency.

Rotor 47 is connected to a source of potential 48 such that as rotor 47 advances past each of the forty-four contacts, it sequentially applies an electrical signal thereto. Each of the forty-four contacts are connected to a separate typewriter key via the leads 1 through 44. The keys with which each of the contacts are associated are designated in FIG. 1A.

A pair of specifically adapted gloves 49A and 49B, shown in FIG. 1D, are fabricated from a light weight pliable material such as nylon or rubber. They contain exposed electrical contacts 50 through 59 located at the tips of each finger. Contacts 50 through 59 are coupled to a source of reference potential 60 (FIG. 1C) through the normally open contacts 61 through 70 of relays 71 through 80. Relays 71 through 80 are coupled via leads 81 through 90 to leads 1 through 44 by diode matrix 91.

The function of diode matrix 91 and relays 71 through 80 is to connect the separate contacts in each glove finger to reference potential 60 when the typewriter key which should be depressed with that finger is being electrified. For example, referring to FIG. 1D it is seen that lead 81 is connected to relay 71 which, when energized, connects the little finger of the left hand to contact 50 to reference potential. In touch typewriting, the little finger of the left hand is used to depress typewriter keys 2, Q, A, Z, and the shift key. Thus lead 81 is connected to leads 1, 2, 41, 42, and 44 such that when rotor 47 advances past the contacts and provides electrical signals to the typewriter keys designated as shift, A, Z, 2, and Q (via leads 44, 42, 41, 2, and 1, respectively) the electrical signal will also be conducted by lead 81 ultimately causing the little finger contact 50 to be connected to reference potential 60 (ground). In a similar manner, each of the other contacts 51 through 59 will be grounded at the same time that an electrical signal is being transmited to the typewriter keys with which they are associated.

The signals from rotary switch 45 on leads 1 through 44 are also transmitted to an alpha-numeric display device 92 via diode matrix 91A. The purpose of alpha-numeric display device 92 is to visually display a replica of the character associated with the typewriter key which is being electrified at any given time. Alpha-numeric display device 92 consists of fourteen neon bars designated B1 through B14 which may be separately illuminated. When the bars are illuminated in various combinations, a visual replica of alphabetic or numeric characters and punctuation symbols can be produced. For example, to generate the character "A" bars, B2, B3, B5, B7, B9, B12, and B14 would be illuminated. Likewise, to generate the character "E" bars B2, B3, B11, B12, and B14 would be illuminated.

Certain ones of the typewriter keyboard symbols are difficult to construct with display device 92. Therefore, the "period" is indicated by illuminating all fourteen neon bars, the "space" is indicated by illuminating the entire upper half of the display device, and the "shift" is indicated by illuminating the entire lower half of the display device. The remaining forty-one symbols are constructed to be displayed as they actually appear.

Figure 3:
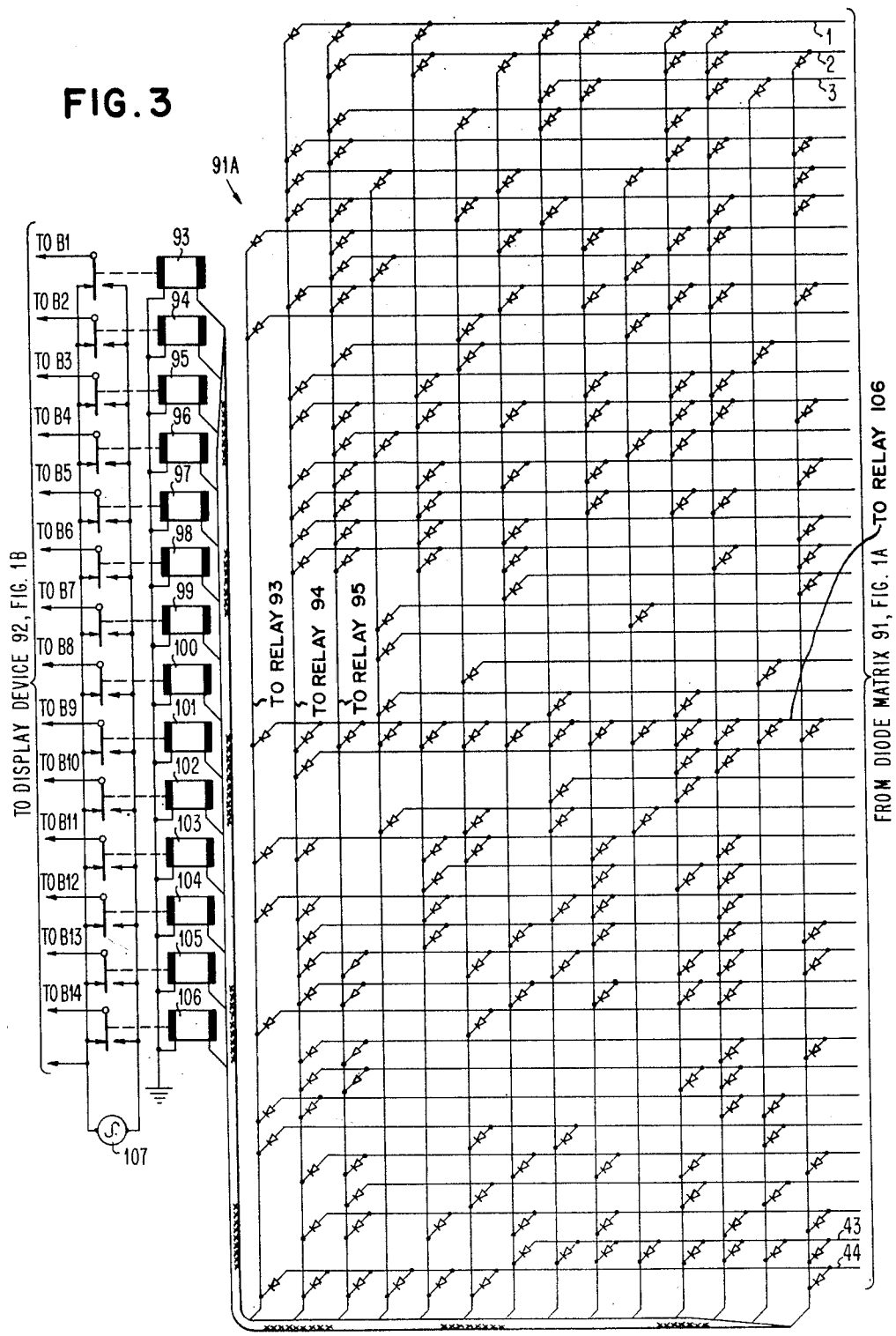

Diode matrix 93, which is shown in detail in FIG. 3, serves to selectively connect each of the separate leads 1 through 44 to the particular ones of bars B1 through B14 which are necessary to produce the associated character. For example, if the character "A" were being electrified by rotor 47 being on the "A" contact, an electrical signal would be present on lead 42. In FIG. 3, the signal on lead 42 would be connected through diodes to relays 94, 95, 97, 99, 101, 104 and 106. These relays then actuate and, through their contacts, apply the 400 cycle A.C. signal from source 107 to illuminate electroluminescent bars B2, B3, B5, B7, B9, B12, and B14 thereby forming the character "A."

The typist, wearing gloves 49A and 49B, attempts to type the character displayed by display device 92. For explanation, consider that character "A" is being displayed as described hereinabove. The contact on the surface of typewriter key "A" will be connected to potential source 48 via lead 42 while the remaining keys will not be electrified. Likewise, the left little finger contact 50 will be connected to reference potential 60 (ground) through locking control device 109 due to the signal on lead 42 energizing relay 71 which closes contact 61. If the typist attempts to depress any but the electrified "A" key the typewriter keyboard will remain locked. If the typist attempts to depress the "A" key with any finger but the left little finger the typewriter keyboard will also remain locked since the glove contacts 51 through 59 are not grounded and, therefore, provide an open circuit condition. However, when the typist depresses the correct key ("A") with the correct finger (left little finger) a circuit is made from potential source 48, through lead 42, through the key contact to contact 50 and then to reference potential 60. The current through this circuit actuates locking control device 109 thereby unlocking keyboard 108 and allowing the "A" key to strike.

The above-described procedure is the same as each of the remaining symbols are called for by the advance of rotor 47 past the remaining rotary switch contacts. Thus, the student typist is obliged, upon command, to strike the proper key with the proper finger and, failing to do so, the locked condition of the keyboard is an immediate indication of error.

It will be apparent from the description of the invention that rotary switches 45 may be operated in a variety of modes. For example, for very inexperienced students, motor 46 can be adapted to advance rotor 47 only when the student ultimately depresses the proper key with the proper finger. In such mode, motor 46 might be a stepping motor which operates from the same signal transmitted to locking control device 109. For more experienced students motor 46 might operate at a constant rate, thereby allowing a selected time interval in which the student must type each character correctly. The rate of motor 46 could then be increased as the student becomes more proficient in the typing skill.

It will be further apparent in accordance with the description of the present invention that it may be modified to include further features such as means for scoring the student's results and means for selectively presenting the characters to accomplish distinct purposes, for example, to provide extra practice with keys that the student has demonstrated a lack of proficiency. In this respect, a more elaborate embodiment of the present invention is provided and described hereinbelow which includes elements which carry out principles of teaching methods of recognized value.

Referring to FIG. 4, a second embodiment of the invention is shown including among other features, a means for varying the order of presentation of typing exercises, provision for recording the student's errors and scoring his performance, and cue lights to prompt the student when necessary. The student is provided with gloves 49A and 49B identical to those shown in FIG. 1B. A standard typewriter 110 is modified by having electrical contacts similar to those shown in FIG. 1C. The keys also include a series of contacts, further described in relation to FIG. 5, which are associated with the keyboard locking mechanism to provide a signal when an attempt is made to depress the keyboard when in the locked position. Whenever elements in FIG. 4 are identical to those described in the previous embodiment, the same reference numbers are used.

Referring to FIG. 5, a section of the keyboard is shown. Each key has associated with it a separate one of forty-four leads 241 through 284 (of FIG. 7) connected to an exposed contact 112 on the surface of the key. The contacts 112 and leads 241 through 284 function in a similar fashion to those described in the embodiment of FIG. 1C. Contacts 113 are shown connected to bars 111 which are in turn connected to locking control device 109, which in the present example may be a solenoid, which moves bars 111 and contacts 113 in a transverse direction. When the keyboard is in the locked position, contacts 113 are located a short distance directly below the keyboard such that they physically prevent the keys from being depressed. When the student has made a correct response, current will flow to reference potential 60 thereby actuating locking control device (solenoid) 109 which removes contacts 113 from beneath the keyboard, permitting the key to be depressed. This is an example of one way the keyboard may be locked and unlocked as required by the embodiment of FIG. 1C. In the embodiment of FIG. 4, contacts 113 are connected by electrical conductors to lead 205. A source of potential 114 is connected via a lead 115 on each keybar to exposed contacts 116 on the bottom of the keyboard. If any key is pressed when the keyboard is locked, that is, when contacts 113 are positioned beneath the keybars, a connection is made through exposed contact 116 on the bottom of the keybar to contact 113 and thereby provides a current path so that a signal from source 114 can be transmitted to the computing stage as an error signal via lead 205 indicating that an attempt has been made to depress an incorrect key or that an incorrect finger was used by the typist. In the event of a correct response by the student contacts 113, being constructed as part of the key locking mechanism, will be removed from the path of the keybars and no error signal will be transmitted via lead 205.

Certain commercially available typewriters are equipped with keyboard locking mechanisms as standard equipment, for example, the IBM Electric Typewriter Model 731 includes a solenoid operated keyboard locking mechanism. In such instances this standard locking mechanism may be readily employed with slight modification as a substitute for the locking mechanism shown in relation to FIG. 5.

Referring again to FIG. 4, a computing stage 117 is shown including a modifiable general memory storage means 118 and logical means 119. The modifiable general memory storage means 118 includes a memory means 120 for retaining the subject matter of the typing exercise; that is, the characters and symbols which are presented to the student as problem exercises. Memory means 120 is referred to as the main dictionary. Modifiable general storage means 118 also includes memory means 121 for retaining the student identification and performance record, referred to as the student record retention means, memory means 122 for retaining the items which the student has answered incorrectly also referred to as the error dictionary, memory means 123 which includes a clock circuit for retaining the student response time, and memory means 125 for retaining decision rules which determine the order of presentation also referred to as the program storage.

Logical means 119 includes a selection means 126 for serially extracting and retaining information from one or more of the retention means within the general memory storage means 118 and a selection control means 127 which alters the serial operation of selection means 126 when random selection of stored material is required; for example, on the basis of student response. Logical means 119 further includes an evaluation means 128 which evaluates student response and stores correctness information in means 121, error information in means 122, and response time information in means 123. An input buffer storage unit 130 is located at the computing stage input and an output buffer storage unit 131 is provided at the computing stage output side. The operation of the input and output buffer storages is conventional, that is, since the operating speed of the computing stage is greater than that of the input and output equipment, the buffer storages are employed to store the input and output information to account for this difference in operating speed. The functions performed by the computing stage 117 as set forth hereinabove, may be carried out by means of a general purpose computer having a modifiable memory storage and an arithmetic unit. The various retention means set forth above may be portions of a memory drum, memory core, or disc storage. The general purpose computer may be programmed according to known techniques to carry out the logical operations required in the present invention. An example of a general purpose computer capable of performing the functional operations required from computing stage 117 is described in U.S. Patent No. 2,959,351 to F. E. Hamilton et al., issued November 8, 1960.

Display unit 132 includes a pictorial diagram of left and right hands, 133 and 134, respectively, with lamps being located at the tips of the fingers of the diagram. A replica of the keys of a typewriter keyboard 135 is provided by means of lamps located in positions corresponding to the locations of the various keys and the space bar. Display unit 132 also includes a display device 92 as described in relation to FIG. 1B. Display device 92 serves to visually display the characters and symbols which are to be presented to the student as problem exercises. Relay circuit 136, shown in detail in FIG. 6, contains the relay logic associated with gloves 49A and 49B. Relay circuit 137 contains the relay logic associated with the typewriter keyboard 110 and is shown in detail in FIG. 7.

To operate the system, the student first presses the start button 138 which resets the computing stage and the relays in circuits 136 and 137. The start signal is also applied to selection means 126 which begins to readout the typewriting lesson from memory means 120. The typewriting lesson consists of all the letters, numbers, and symbols of the typewriter keyboard and are read out and transmitted character by character. A coded representation of each character is transmitted from output buffer storage 131 in the form of combinations of discrete signals appearing simultaneously on selected ones of leads 139 through 144. Leads 139 through 144 are coupled, respectively, to relays 145 through 150 of relay circuit 137. Referring to FIG. 7, it is seen that by applying signals simultaneously to selected ones of leads 139 through 144, selected ones of relays 145 through 150 will be energized. By actuating various combinations of relays 145 through 150 each of leads 241 through 284 can be separately coupled to reference potential 60 through the keyboard locking control device 109. Thus, the lead 284 is coupled to reference potential 60 by not actuating any of the relays 145 through 150, lead 283 is coupled by reference potential 60 by actuating relay 150, lead 282 is coupled to reference potential 60 by actuating relay 149, and lead 281 is coupled to reference potential by actuating relays 149 and 150 simultaneously. In this manner, any one of the forty-four leads 241 through 284 can selectively be coupled to reference potential 60 by discrete combinations of signals transmitted from computing stage 117. Each one of leads 241 through 284 are coupled to a separate key of keyboard 110 as shown in detail in FIG. 5, thus the separate keys of the keyboard are coupled to reference potential (ground) in sequence in response to command signals transmitted from the computing stage. At the same time that the separate keys of keyboard 110 are being selectively grounded the associated finger of gloves 49A and 49B are being electrified. The signals determining which fingers of gloves 49A and 49B are to be electrified are read out from memory storage 120 by selection means 126 along with the signals determining which keyboard key is to be grounded. The information determining which glove finger is to be electrified is transmitted in the form of combinations of simultaneous signals on given ones of leads 186 through 189. Leads 186 through 189 are, respectively, coupled to relays 190 through 193. Depending on which combinations of relays 190 through 193 are actuated, potential source 194 may be coupled to any one of output leads 195 through 204. Output leads 195 through 204 are in turn coupled, respectively, to contacts 50 through 59 in the tips of gloves 49A and 49B, as shown in FIG. 4. Thus, as each keyboard key is grounded, the correct finger for depressing that key is electrified. For example, when keys Q, A, Z, 2, or the shift key are grounded, a signal is applied to contact 50 from source 194 via output lead 195 by the appropriate selection of relays 190 through 193.

Concurrent in time with a typewriter key being grounded and the associated glove contact being electrified, the character associated with the selected key is being displayed on alpha-numeric display device 92. Display device 92 is identical to that depicted in FIG. 1B. The fourteen electroluminescent bars which compose the device are coupled to a source of A.C. signal by means of fourteen relays in a manner similar to that shown in FIG. 3. The input leads of the fourteen relays are coupled directly to output buffer storage 131 via the fourteen leads 206 through 219. Signals are transmitted on appropriate ones of leads 206 through 219 to form the various characters as was described in relation to FIG. 1B. The student is thereby instructed to type given characters as they appear in sequence on display device 92. As in the embodiment of FIGS. 1A through 1D, the student attempts to depress a selected typewriter key with a selected finger according to his judgment.

If the student attempts to depress an ungrounded key with an unelectrified finger, or a grounded key with an unelectrified finger, or an ungrounded key with an electrified finger, he will be in error and no circuit path will be made from potential source 194 to reference level 60. However, in the event of any such incorrect choices the incorrectly selected key will be physically depressed a slight amount until it is impeded by the keyboard locking mechanism. When this occurs the incorrectly selected key will bear against the associated contact 113 (FIG. 5) and a circuit will be made from potential source 114, through contacts 116 and 113 thereby transmitting an error signal to the computing stage. More specifically, the error signal transmitted through contact 113 is applied via lead 205 to input buffer storage 130 to evaluation means 128 included in logical means 119. Evaluation means 128 causes the particular character with which the student is in error to be recorded in the error dictionary storage 122 and records the occurrence of an error in the student record retention means 121.

The reception of an error signal by evaluation means 128 also institutes the prompting feature of the system. The operation of the prompting feature is as follows. At the same time that the typewriter key signals are transmitted via leads 139 through 144 to relay circuit 137, a parallel branch connection transmits them to relay circuit 220. Likewise, as the glove contact signals are transmitted to relay circuit 136 via leads 186 through 189, a parallel connection transmits them to relay circuit 221. Relay circuit 221 is identical to that shown in FIG. 6, that is, the signal combinations on leads 186 through 189 will cause the four relays within circuit 221 to provide an output signal on a selected one of the ten leads designated 222 through 231. Each of the leads 222 through 231 is connected to a separate lamp in the fingers of display replicas 133 and 134 such that when one of the glove contacts 50 through 59 is electrified, the lamp in the corresponding finger of the replicas 133 and 134 can be illuminated. However, the signal from circuit 221 is inhibited, and it is not until the student has made an incorrect key selection (and an error signal has been transmitted to evaluation means 128) that the cue lamps in replicas 133 and 134 are illuminated. The reception of the error signal by evaluation means 128 causes a cue signal to be transmitted via lead 232 to display 132 thereby permitting the signals on leads 222 through 231 to illuminate the cue lamps in replicas 133 and 134. Likewise, relay circuit 220 is identical to the circuit shown in FIG. 7 with the exception that the circuit is connected to a positive potential source rather than to locking control device 109 and reference potential 60 as shown in the drawings. Thus, as the signal combinations on leads 139 through 144 are applied to the six relays within circuit 220 a positive voltage is applied via a selected one of the forty-four output leads to the lamp within display 135 that corresponds to the key of keyboard 110 that is being grounded. The signals from relay circuit 220 are also prevented from actuating the lamps of keyboard replica until the reception of the cue signal on lead 232. The inhibit device which prevents the lamps of displays 133, 134, and 135 from illuminating until the reception of a cue signal may consist of nothing more than a normally open switch between the lamps and circuits 220 and 221, which is closed by a relay responsive to the cue signal on lead 232.

It is seen, therefore, that if the student does not strike the key associated with the character or symbol displayed on device 92, his error will be recorded, the mistaken character or symbol will be stored in the error dictionary, and the cue lamps of display 132 will indicate to the student the proper key and the proper finger to be used.

If in the first instance the student responds to the character or symbol displayed on device 92 correctly, that is, if he depresses the correct (grounded) key with the correct (electrified) finger there will be a circuit completed from potential source 194 through the selected one of output leads 195 through 204, through the selected one of contacts 50 through 59, through the appropriate key contact 112, via the selected one of leads 241 through 284 through locking control device 109 to reference potential 60. The signal through the circuit actuates locking control device 109, thereby unlocking the keyboard and permitting the key to be completely depressed and strike. Since the signal transmitted through locking control device 109 to reference potential 60 is indicative of a correct response, the actuation of locking control device 109 may also serve to produce a "correct" signal (i.e. by means of a simple relay) which is tranmitted via lead 185 to the computing stage 117 to indicate that the student is correct. When the student is correct, there will, of course, be no error signal transmitted on lead 205, contacts 113 having been removed from the path of the keyboard along with the locking mechanism. Therefore, there will be no cue signal generated and no actuation of the cue lamps in display panel 132. The "correct" signal transmitted to computing stage 117 is applied through input buffer 130 to evaluation means 128. Evaluation means 128 causes a "correct" indication to be stored in the student record storage means 121 and instructs selection means 126 to readout the next problem character from main dictionary 120 for presentation to the student. Prior to the presentation of the next succeding problem a reset pulse is generated by computing stage 117 which is transmitted via lead 124 to reset the relays contained in relay circuits 136, 137, 220, and 221.

It is possible that when a problem character is presented to the student he will be uncertain as to which key to depress or which finger to use. If the student hesitates a predetermined length of time, it is indicative that he is weak in his knowledge as to the correct answer to the presented problem. In order to account for this factor a real time clock is included in the student response time memory means 123. When a predetermined time elapses after the presentation of a problem on display device 92 and neither a "correct" nor an "error" signal has been transmitted on leads 185 or 205, a signal instituted by the clock circuit will store an "error" indication in student record retention means 121, store the character in error in error dictionary 122, and transmit a cue signal on lead 232 to prompt the student. The clock circuit is also employed to record the overall time that elapses for the student to complete the entire typing exercise stored in main dictionary 120 as typing rate is a significant factor in determining the ability of the student. The total time for the student to complete the typing exercise is stored in the student record retention means 121 along with the other performance factors.

To recapitulate, the following is a brief description of the operation of the embodiment of the present invention shown in FIG. 4.

(1) The student presses the start button 138 which resets the computing stage 117, relay circuits 136 and 137 start the clock cycle in means 123 and start the sequential selection means 126.

(2) Sequential selection means 126 reads out the first problem from main dictionary 120 and transmits it through output buffer 131 to alpha-numeric display device 92, transmits appropriate key information to keyboard 110 (via relay circuit 137) and to cue lamps 135 (via circuit 220), and transmits appropriate finger information to gloves 49A and 49B (via relay circuit 136) and to cue lamps 133 or 134 (via relay circuit 221). It is noted that cue lamps 133, 134, and 135 are not illuminated at this time.

(3) The student responds to the problem displayed on device 92 by selecting and depressing a key on locked keyboard 110 with a selected one of his gloved fingers.

(3A) If the correct key is depressed with the correct finger, a circuit from the glove through the keyboard is completed and locking control device 109 unlocks the keyboard permitting the key to strike. A "correct" signal is transmitted from locking control device 109 to computing stage 117 which stores a "correct" indication in record storage 121 and causes sequential selection means 126 to readout the next problem from main dictionary 120. Step 3 is then repeated.

(3B) If the selected key, the selected finger, or both are incorrect, no circuit is completed and keyboard 110 remains locked. An error signal is transmitted to computing stage 117 wherein the error occurrence is recorded in record storage 121, the character in error is stored in error dictionay 122, and the correct key and finger are indicated on cue lamps 133 or 134 and 135 as a result of a cue signal on lead 232. The student responds to the same problem now aided by the cue lamps. If he responds correctly, the problem is again repeated but without the cue lamps; but, if he responds incorrectly, the problem is repeated with the cue lamps. In either case, after the third repetition of the problem the next problem is displayed and step 3 is then repeated.

(4) If the student does not respond to step 2 by depressing a keyboard key within a predetermined time established by clock circuit 123, a cue signal is generated which actuates the cue lights and an error is recorded in storage 121 and the character in error is stored in error dictionary 122. The student then responds to the problem aided by the cue lamps as set forth in step 3B.

(5) After steps 3 or 4, the subsequent problems are selected and displayed until the completion of the exercise.

(6) After the exercise is completed, a second exercise may be presented with problems selected exclusively from error dictionary 122 as a remedial exercise to provide the student with concentrated practice in his weak areas or (7) Based on the characteristics of the characters in the error dictionary a further exercise may be assembled by evaluation means 128 and selection control means 127 to selectively readout from main dictionary 120 problems related to those which the student is commonly in error and eliminating those problems with which the student has demonstrated his proficiency. For example, if the student has an unusual amount of errors with his left hand, an exercise may be assembled composed of all the characters associated with the left side of the keyboard.

In the discussion of the operation of computing stage 117, the specific structure of the memory and logical means has not been detailed and the operation of the component parts of the computing stage has been developed in terms of function. This was done in the interest of brevity and clarity and in view of the fact that the described funcitons of the computing stage can be carried out by conventional programming techniques and existing general purpose computers, for example, that shown in U.S. Patent No. 2,959,351 to F. E. Hamilton et al., mentioned hereinabove.

It is obvious to one skilled in the art that the operation of the more versatile embodiment of FIG. 4 is not strictly limited to steps 1 through 7, listed hereinabove, but that variations may be made, for example, by modifying the program of the computing stage 117.

What has been described is an improved educational device for the teaching and testing of manual, finger manipulative skills. It is seen that in the embodiments of the invention relating to the skill of touch typewriting, the first embodiment illustrates a simple, unique device whereby a student, upon a sequence of visual commands, is directed to select and depress the keys of a typical typewriter keyboard. The invention provides that the correct key must be depressed with the correct finger for the keyboard to be operative; and in the event of an error, the keyboard remains in a locked condition providing an immediate error indication to the student. In the second embodiment, the training and testing abilities of the device are enhanced by the combination including a general purpose computer and a system of cue lights. The novel combination provides such added aids to the learning process as the ability to vary the typing exercise to repeat the material in which the student is deficient and to eliminate the material with which the student is proficient; or to construct new exercises having subject matter related to the student's demonstrated weaknesses. The combination provides for immediate error indication, prompting, student-machine interaction, and response time monitoring.

It should be noted that while the described embodiments related to the skill of touch typewriting, the principles of the present invention may be applied to any skill where proper finger manipulation is a factor, including keyboard devices such as teletype, accounting and keypunch machines as well as certain musical instruments.

While the invention has been particularly shown and described with reference to preferred embodiments thereof, it will be understood by those skilled in the art that various changes in form and details may be made therein without departing from the spirit and scope of the invention.

What is claimed is:

1. An apparatus for teaching manual dexterity comprising in combination:
   keyboard means including a plurality of separate keys adapted to be manually displaced in position,
   inhibit means coupled to said keyboard means to prevent said position displacement of each of said keys,
   a plurality of separate electrical contacts, means for mounting said contacts on a separate finger of a keyboard operator, and means to disengage said inhibit means from said keys when predetermined ones of said electrical contacts are manually brought into physical contact with predetermined ones of said keys.

2. An apparatus for teaching a psycho-motor skill comprising in combination:
   a manual response device including a plurality of elements adapted to be selectively manipulated to produce information signals,
   signal generating means coupled to said manual response device for applying a first signal condition on a selected one of said plurality of elements,
   a plurality of conductors each of said conductors being mounted in a separate finger tip of a pair of gloves and coupled to said signal generating means, said signal generating means applying a second signal condition on a selected one of said plurality of conductors,
   and means coupled to said manual response device to enable the production of said information signals when said selected one of said conductors is manually brought into contact with said selected one of said elements.

3. An apparatus for teaching keyboard manipulative dexterity comprising in combination:

a keyboard device including a plurality of separate keys adapted to be selectively manipulated to produce information signals, locking means coupled to said keyboard device for maintaining said keys in normally locked condition, signal generating means including a plurality of conductors, each of said conductors being coupled to a separate one of said keys for selectively applying a first signal condition to a given one of said keys, a plurality of contacts, means coupling said signal generating means to said plurality of contacts for selectively applying a second signal condition to a given one of said contacts, and means coupled to said locking means to unlock said keys when said given one of said contacts is coupled to said given one of said keys.

4. An apparatus for teaching keyboard manipulative dexterity according to claim 3 wherein said separate ones of said plurality of contacts are affixed to the finger tips of a pair of gloves adapted to be worn by a keyboard operator.

5. An apparatus for teaching keyboard manipulative dexterity comprising in combination:

a typewriting device having exposed electrical contacts on the upper surface of the keys thereof, locking means coupled to said typewriting device for maintaining said keys in a normally locked condition, means for selectively applying a first electrical potential to said contacts on said keys, a pair of gloves having electrical contacts affixed to the finger tips thereof, means for selectively applying a second electrical potential to said contacts on said gloves, and means coupled to said locking means to unlock said keys when said glove contact having said second potential selectively applied thereto is brought into contact with said keys having said first potential selectively applied thereto.

6. An apparatus for teaching keyboard manipulative dexterity according to claim 5 having a display device for visually presenting the symbol associated with the typewriter key having said first electrical potential applied to the contact thereon.

7. An apparatus for the teaching and testing of the skill of touch typewriting comprising in combination:

signal generating means for sequentially generating a series of signals, a typewriting device having exposed electrical contacts on the upper surface of the keys thereof and a locking mechanism to maintain said keys in a normally locked condition, first switching means responsive to said signals from said signal generating means for selectively applying a first electrical potential to said contacts on said keys, a pair of gloves having an exposed electrical contact in each finger tip thereof, second switching means responsive to said signals from said signal generating means for selectively applying a second electrical potential to said contacts on said gloves, a display device responsive to said signals from said signal generating means for visually presenting the symbols associated with the typewriter keys having said first electrical potential selectively applied to the contacts thereon, and a control device coupled to said locking device and responsive to the potential difference resulting when the glove contact having said second potential selectively applied thereto is connected to the key contact having said first potential applied thereto for unlocking said keys.

8. An apparatus for teaching a psycho-motor skill comprising in combination:

a modifiable memory storage means for storing a plurality of discrete information, selection means cooperatively coupled to said memory means for reading out said stored information, first communication means responsive to said information readout from said memory means by said selection means, said first communication means including a first presentation means for displaying said readout information, second communication means responsive to physical motion for producing information signals, said second communication means including a manual response device having a plurality of separate contacts mounted on movable elements for producing information signals in response to selective manipulation thereof, and a plurality of conductors responsive to said information read out from said memory means by said selection means, each of said conductors being mounted in a separate finger tip of a pair of gloves and adapted to be brought into physical contact with said separate contacts mounted on movable elements of said manual response device for selective manipulation thereof.

9. An apparatus for teaching keyboard manipulative dexterity comprising in combination:

a modifiable memory storage means for storing a plurality of discrete information signals, selection means cooperatively coupled to said memory means for reading out said stored information signals, a typewriting device having a keyboard modified by having an exposed electrical contact on the upper surface of each of the keys and a locking device to maintain said keys in a locked condition, a first switching device coupled to said selection means and said key contacts for selectively applying a first electrical potential to said key contacts in response to said information signals, a pair of gloves modified by having an exposed electrical contact affixed to each of the finger tips, a second switching device coupled to said selection means and said glove contacts for selectively applying a second electrical potential to said glove contacts in response to said information signals, a display device coupled to said selection means and responsive to said information signals therefrom for visually presenting the symbols associated with the typewriter key having said first electrical potential applied thereto, and control means coupled to said locking device to unlock said keyboard in response to the difference in potential occurring when said selected glove contact having said second potential applied thereon is connected to said selected key contact having said first potential applied thereon.

10. An apparatus for teaching keyboard manipulative dexterity comprising in combination:

a modifiable memory storage means for storing a plurality of discrete information signals, selection means cooperatively coupled to said memory means for reading out said stored information, a typewriting device having a keyboard modified by having an exposed electrical contact on the upper surface of each of the keys and a locking device to maintain said keys in a locked condition, said locking device including mechanical stops disposed beneath each of said keys to restrict key depression, means coupled to said locking device to generate an error signal when said keys come in contact with said mechanical stops, a first switching device coupled to said selection means and said key contacts for selectively applying a first electrical potential to said key contacts in response to said information signals, a pair of gloves modified by having an exposed electrical contact affixed to each of the finger tips, said gloves adapted to be worn by a keyboard operator for depressing said keys, a second switching device coupled to said selection means and said glove contacts for selectively applying a second electrical potential to said glove contacts in response to said information signals, a display device coupled to said selection means and responsive to said information signals therefrom for visually presenting the symbols associated with the typewriter key having said first electrical potential applied thereto, and control means coupled to said locking device to remove said mechanical stops from beneath said keys in response to the difference in potential occurring when said selected glove contact having said second potential applied thereon is connected to said selected key contact having said first potential applied thereon, thereby permitting said selected key to be depressed.

11. An apparatus for teaching keyboard manipulative dexterity according to claim 10 wherein said display device further includes a first pluralty of display lamps physically arranged with respect to each other to resemble the physical arrangement of said typewriter keys, the one of said first plurality of lamps corresponding to said typewriter key having said first electrical potential applied thereon being illuminated in response to said error signal.

12. An apparatus for teaching keyboard manipulative dexterity according to claim 11 wherein said display device further includes a second plurality of display lamps physically arranged with respect to each other to resemble the physical arrangement of said glove contacts, the one of said second plurality of lamps corresponding to said glove contact having said second electrical potential applied thereon being illuminated in response to said error signal.

13. An apparatus for teaching keyboard manipulative dexterity comprising in combination:

a modifiable memory storage means for storing a plurality of discrete information signals, selection means cooperatively coupled to said memory means for reading out said stored information, a typewriting device having a keyboard modified by having an exposed electrical contact on the upper surface of each of the keys and a locking device to maintain said keys in a locked condition, said locking device including mechanical stops disposed beneath each of said keys to restrict key depression, means coupled to said locking device to generate an error signal when said keys come in contact with said mechanical stops, a first switching device coupled to said selection means and said key contacts for applying a first electrical potential to selected key contacts in response to said information signals, a pair of gloves modified by having an exposed electrical contact affixed to each of the finger tips, said gloves adapted to be worn by a keyboard operator for depressing said keys, a second switching device coupled to said selection means and said glove contacts for applying a second electrical potential to selected glove contacts in response to said information signals, a display device coupled to said selection means and responsive to said information signals therefrom, said display device including a first plurality of display lamps for visually presenting the symbols associated with the typewriter key having said first electrical potential applied thereto, a second plurality of display lamps physically arranged with respect to each other to resemble the physical arrangement of said typewriter keys, the one of said second plurality of lamps corresponding to said typewriter key having said first electrical potential applied thereon being illuminated in response to said error signal, a third plurality of display lamps physically arranged with respect to each other to resemble the physical arrangement of said glove contacts, the one of said third plurality of lamps corresponding to said glove contacts having said second electrical potential applied thereon being illuminated in response to said error signal, and control means coupled to said locking device to remove said mechanical stops from beneath said keys in response to the difference in potential occurring when said selected glove contact having said second potential applied thereon is connected to said selected key contact having said first potential applied thereon, thereby permitting said selected key to be depressed, said modifiable memory means including first retention means for retaining information signals related to the symbols associated with a typewriter keyboard, second retention means for retaining selected ones of said information signals retained in said first retention means in response to the occurrence of said error signals, third retention means for retaining information related to the number of error signals produced, fourth retention means for retaining information governing the operation of said selection means, and a fifth retention means for retaining the elapsed time between the presentation of the symbols on said first plurality of display lamps and the depression of said keys on said typewriting device, said selection means including means for selecting given ones of said information signals, a selection control means for controlling said means for selecting for reading out said information signals from said modifiable memory storage in serial and random modes, and evaluation means responsive to said information signals retained in said third and fifth retention means for governing the further reading out of said information signals from said first retention means by said selection and selection control means.

References Cited in the file of this patent

UNITED STATES PATENTS

| | | |
|---|---|---|
| 1,984,599 | Safar | Dec. 18, 1934 |
| 2,613,453 | Gecsei | Oct. 14, 1952 |
| 2,783,454 | North | Feb. 26, 1957 |
| 2,970,386 | Knutson | Feb. 7, 1961 |
| 3,021,937 | Seymour | Feb. 20, 1962 |
| 3,103,073 | Nickl et al. | Sept. 10, 1963 |

FOREIGN PATENTS

| | | |
|---|---|---|
| 153,527 | Germany | Aug. 4, 1904 |
| 762,367 | Great Britain | Nov. 28, 1956 |